United States Patent [19]

Harada et al.

[11] Patent Number: 4,754,836

[45] Date of Patent: Jul. 5, 1988

[54] CONTROL METHOD AND DEVICE FOR AUTOMOTIVE VEHICLE FOUR WHEEL DRIVE TRANSMISSION SUPPRESSING FRONT/REAR DIFFERENTIAL ACTION WHEN AUTOMATIC MAIN TRANSMISSION IS IN INTERMEDIATE HOLD RANGE

[75] Inventors: Yoshiharu Harada; Yutaka Taga; Kunio Morisawa, all of Toyota, Japan

[73] Assignee: Toyota Jidosha Kabushiki Kaisha, Aichi, Japan

[21] Appl. No.: 900,395

[22] Filed: Aug. 26, 1986

[30] Foreign Application Priority Data

Aug. 28, 1985 [JP] Japan ................................. 60-188824

[51] Int. Cl.$^4$ ............................................. B60K 17/34
[52] U.S. Cl. ................................... 180/249; 74/665 T; 74/740; 74/866; 192/0.052; 192/0.073; 192/0.092; 364/424.1
[58] Field of Search ............... 180/249, 248, 250, 233; 364/424.1; 192/0.052, 0.073, 0.075, 0.076, 0.092, 103 R; 74/740, 761, 763, 765, 665 T, 695, 866

[56] References Cited

U.S. PATENT DOCUMENTS

| | | | |
|---|---|---|---|
| 4,441,575 | 4/1984 | Suzuki | 180/250 X |
| 4,562,541 | 12/1985 | Sakakiyama | 364/424.1 |
| 4,605,087 | 8/1986 | Ashauer et al. | 180/233 X |
| 4,618,022 | 10/1986 | Hayashi | 180/249 |
| 4,650,202 | 3/1987 | Tsuzuki | 180/248 |

*Primary Examiner*—David M. Mitchell
*Assistant Examiner*—Mitchell J. Hill
*Attorney, Agent, or Firm*—Parkhurst & Oliff

[57] ABSTRACT

A full time four wheel drive transmisson system for a vehicle includes a gear transmission mechanism, driven by an engine, which is automatically controlled to operate in any of several forward ranges of speed stages including a drive range and a set containing one or more intermediate hold ranges in which the engagement of at least one of the upper speed stages included in the drive range is prohibited. The transmission system also includes a central differential device, driven from the gear transmission mechanism, which provides rotational power to the combination of the front wheels of the automotive vehicle and to the combination of the rear wheels of the automotive vehicle while providing differential action between these combinations. The central differential device has a clutch which when engaged at least partly inhibits its differential action. During vehicle operation, the clutch of the central differential device is engaged when the gear transmission mechanism is being controlled to operate in one of the set of intermediate hold speed ranges. Thereby, good vehicle high power characteristics and good engine braking characteristics are obtained. The engagement of the central differential device clutch further may be conditional on the engine throttle being substantially fully closed.

2 Claims, 3 Drawing Sheets

CONTROL METHOD AND DEVICE FOR AUTOMOTIVE VEHICLE FOUR WHEEL DRIVE TRANSMISSION SUPPRESSING FRONT/REAR DIFFERENTIAL ACTION WHEN AUTOMATIC MAIN TRANSMISSION IS IN INTERMEDIATE HOLD RANGE

BACKGROUND OF THE INVENTION

The present invention relates to a method and a device for controlling a four wheel drive transmission system for an automotive vehicle, and more particularly relates to a method and a device for controlling such a four wheel drive transmission system, in which the main transmission mechanism of the vehicle is an automatic transmission device.

The present invention has been described in Japanese Patent Application Ser. No. 60-188824 (1985), filed by an applicant the same as the entity assigned or owed duty of assignment of the present patent application; and the present patent application hereby incorporates into itself by reference the text of said Japanese Patent Application and the claim and the drawings thereof; a copy is appended to the present application.

In Japanese Utility Model Laying Open Publication Ser. No. 47-203 (1972), Japanese Patent Laying Open Publication Ser. No. 55-72420 (1980), and SAE (Society of Automotive Engineers) publication serial no. 710615, none of which is it intended hereby to admit as prior art to the present patent application except to the extent in any case required by applicable law, there are disclosed variations upon the theme of fitting a four wheel drive vehicle such as a so called full time four wheel drive vehicle with an automatic transmission system. These publications disclose the concept of feeding engine output rotational power via an automatic transmission device of a per se known sort to the input side of a center differential device, said center differential device having two output sides, a rear wheels output side and a front wheels output side, and providing differential action between its said rear wheels output side and its said front wheels output side: in other words constraining the total sum of the incremental rotational amounts of its rear wheels output side and its front wheels output side (optionally including scale factors) to be substantially equal to twice the incremental rotational amount of its input side while allowing said total incremental rotational amount sum to be substantially arbitrarily distributed between its rear wheels output side and its front wheels output side. The rear wheels output side of said center differential device is connected to the input side of a differential device of a per se known sort for providing differential action between the left rear wheel and the right rear wheel of the vehicle, while similarly the front wheels output side of said center differential device is connected to the input side of a differential device also of a per se known sort for providing differential action between the left front wheel and the right front wheel of the vehicle. And there is disclosed the concept of providing said center differential device with a control clutch, which when engaged substantially prevents said center differential device providing such differential action and instead, more narrowly, constrains each of the incremental rotational amounts of its said rear wheels output side and its said front wheels output side to be individually substantially equal (again, optionally with scale factors) to the incremental rotational amount of its said input side; while, on the other hand, when said center differential device control clutch is released, said center differential device is allowed to provide the aforementioned differential action.

Thus, by selectively either engaging or disengaging said center differential device control clutch, selective differential action can be provided or not provided between the rear wheels and the front wheels of the vehicle, as desired. Typically, in fact, differential action is desired between the rear wheels and the front wheels of the vehicle, when the vehicle is rounding a corner. On the other hand, differential action is in fact not desired between the rear wheels and the front wheels of the vehicle, when the vehicle is being operated in a high power output mode such as when climbing a relatively steep hill or other slope, or alternatively when engine braking is desired, or alternatively when fine control of the vehicle is particularly required. This is because such differential action between the rear wheels and the front wheels of the vehicle deteriorates good vehicle power driving characteristics, tends to reduce the effectiveness of engine braking, and impairs fine control of the vehicle. Therefore, there is a requirement for control of the selective engagement and disengagement of the center differential device control clutch, and it might be conceived of to perform such control clutch control by manual operation by the driver. However, the problem with this is that such control is distracting to the driver and also its effectiveness depends upon the driving skill of the driver. Accordingly, it is not realistic to expect fine manual control of such a central differential device control clutch to be provided by the driver, in view of the diversity of other control responses required from said driver during vehicle operation, especially in the above outlined case that the transmission system of the vehicle is an automatic transmission, since the demands for case of use, imposed by the user public upon such a power train configuration incorporating an automatic transmission, are inevitably more exigent than the demands imposed upon a power train incorporating a manual transmission.

SUMMARY OF THE INVENTION

The inventors of the present invention considered the various problems detailed above, from the point of view of the desirability of providing automatic control of the engagement and disengagement of such a central differential device control clutch of a central differential device of a vehicle which has an automatic transmission; and the present inventors came to the realization that the principal determinant factor as to whether said central differential device control clutch should be not engaged, or should be engaged, might be considered to be whether the automatic transmission of the vehicle was manually set by the driver to the drive or the "D" range, or was set to a so called intermediate hold range such as the "L" range or the "S" range. This is because, when said vehicle automatic transmission is set to such an intermediate hold range such as the "L" range or the "S" range, it is typically either because high and well controlled engine power output is required for climbing a relatively steep hill or other slope, or alternatively because relatively strong engine braking is desired as for descending such a hill or other slope. Accordingly, it occurred to the present inventors to classify the operational states of the vehicle according to the transmission shift range manually set by the vehicle driver upon a manual range setting control or the like for the transmission, and to control the provision or non provision of front/rear differential action by the central differential device according to such classification.

Accordingly, it is the primary object of the present invention to provide a method for control of a four wheel drive transmission system for an automotive vehicle incorporating such a central differential device with such a control clutch as described above, and an automatic transmission system, which avoids the problems detailed above.

It is a further object of the present invention to provide such a method for control of such a four wheel drive transmission system for an automotive vehicle, which appropriately provides differential action between the rear wheels of the vehicle and the front wheels of the vehicle, according to vehicle operational circumstances.

It is a further object of the present invention to provide such a method for control of such a four wheel drive transmission system for an automotive vehicle, which does not impose any substantial control burden upon the vehicle driver.

It is a yet further object of the present invention to provide such a method for control of such a four wheel drive transmission system for an automotive vehicle, which provides good engine output power and hill climbing characteristics.

It is a yet further object of the present invention to provide such a method for control of such a four wheel drive transmission system for an automotive vehicle, which provides good engine braking and hill descending characteristics.

It is a yet further object of the present invention to provide such a method for control of such a four wheel drive transmission system for an automotive vehicle, which provides good vehicle control.

It is a yet further concomitant object of the present invention to provide a device which implements such methods, so as to achieve at least some of the objects detailed above.

According to the most general method aspect of the present invention, these and other objects are attained by a method for control of a four wheel drive transmission system for an automotive vehicle, said transmission system comprising: a gear transmission mechanism, driven by an engine of said vehicle, which is automatically controlled to operate in any of several forward ranges of speed stages including a drive range and a set containing one or more intermediate hold ranges in which the engagement of at least one of the upper speed stages included in said drive range is prohibited; and: a central differential device, driven from said gear transmission mechanism, which provides rotational power to front wheels of said automotive vehicle and to rear wheels of said automotive vehicle while providing differential action between the combination of said front wheels and the combination of said rear wheels, said central differential device comprising a clutch which when engaged at least partly inhibits said differential action; wherein, during vehicle operation, said clutch of said central differential device is engaged when said gear transmission mechanism is being controlled to operate in one of said set of intermediate hold speed ranges. According to the most general device aspect of the present invention, these and other objects are attained by a device for control of a four wheel drive transmission system for an automotive vehicle, said transmission system comprising: a gear transmission mechanism, driven by an engine of said vehicle; and: a central differential device, driven from said gear transmission mechanism, which provides rotational power to front wheels of said automotive vehicle and to rear wheels of said automotive vehicle while providing differential action between the combination of said front wheels and the combination of said rear wheels, said central differential device comprising a clutch which when engaged at least partly inhibits said differential action said control; device comprising: a means for, during vehicle operation, automatically controlling said gear transmission mechanism to operate in any of several forward ranges of speed stages including a drive range and a set containing one or more intermediate hold ranges in which the engagement of at least one of the upper speed stages included in said drive range is prohibited; and: a means for, during vehicle operation, controlling said clutch of said central differential device to engage it when said gear transmission mechanism is being controlled to operate in one of said set of intermediate hold speed ranges by said automatic control means therefor.

According to such a method and such a device as specified above, since when said gear transmission mechanism is being controlled to operate in one of said set of intermediate hold speed ranges the clutch of said central differential device is engaged, therefore in such operational circumstances the differential action between the vehicle front wheels and the vehicle rear wheels is at least partly inhibited. Accordingly, when the vehicle transmission is being operated in one of said set of intermediate hold speed ranges, such as an "S" range or an "L" range, very good hill climbing characteristics and/or very good engine braking characteristics are made to be available.

Further, according to a particular specialization of the present invention: on the method side, the above specified and other objects are more particularly attained by a method for control of a four wheel drive transmission system for an automotive vehicle as specified above, wherein, during vehicle operation, said clutch of said central differential device is engaged when said gear transmission mechanism is being controlled to operate in one of said set of intermediate hold speed ranges and also a throttle valve of said engine of said automotive vehicle is substantially fully closed; and similarly, on the device side, said above specified and other objects are more particularly attained by a device for control of a four wheel drive transmission system for an automotive vehicle as specified above, wherein, during vehicle operation, said control means for said clutch of said central differential device engages said clutch when said gear transmission mechanism is being controlled by its said control means to operate in one of said set of intermediate hold speed ranges and also a throttle valve of said engine of said automotive vehicle is substantially fully closed.

According to this more specialized concept, the operation of the present invention is particularly directed towards the engine braking aspect thereof, and is not particularly deployed during high engine load operation. This may be particularly appropriate for some circumstances.

BRIEF DESCRIPTION OF THE DRAWINGS

The present invention will now be described with respect to the preferred embodiments thereof, and with reference to the illustrative drawings appended hereto, which however are provided for the purposes of explanation and exemplification only, and are not intended to be limitative of the scope of the present invention in any way, since this scope is to be delimited solely by the accompanying claims. With relation to the figures, spatial terms are to be understood as referring only to the orientation on the drawing paper of the illustrations of the relevant parts, unless otherwise specified; like reference numerals, unless otherwise so specified, denote the same parts and gaps and spaces and so on in the various figures relating to one preferred embodiment, and like parts and gaps and spaces and so on in the figures relating to different preferred embodiments, and;

DESCRIPTION OF THE PREFERRED EMBODIMENTS

The present invention will now be described with reference to the preferred embodiments thereof, and with reference to the figures.

OVERALL TRANSMISSION SYSTEM CONSTRUCTION

Figure 1:
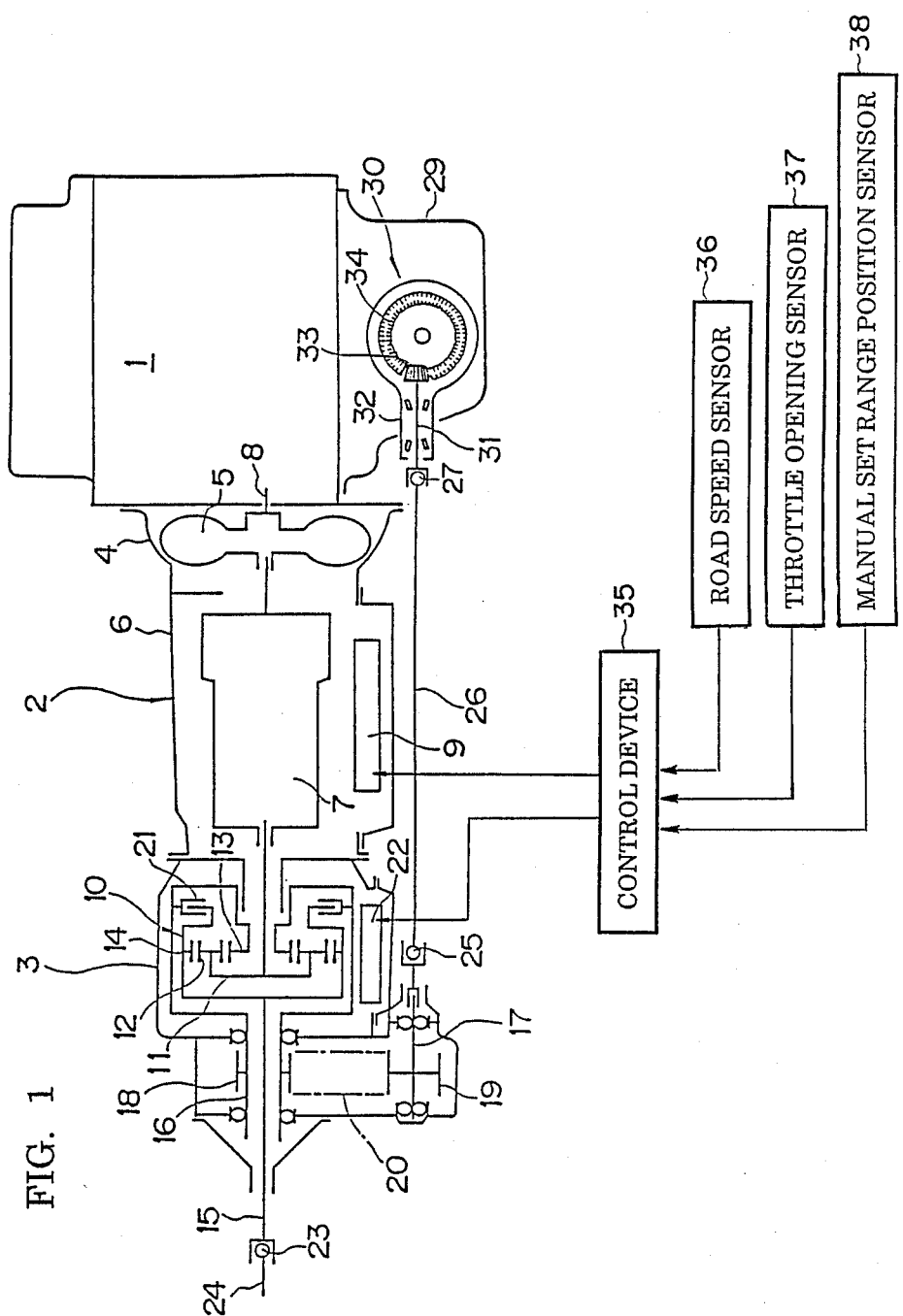
FIG. 1 is a schematic part block diagrammatical view of a vehicle four wheel drive transmission system which comprises an automatic transmission device and a central differential device with a control clutch, and which can incorporate either one of the first and the second preferred embodiments of the transmission control device of the present invention, for practicing either one of the first and the second preferred embodiments of the transmission control method of the present invention.

FIG. 1 shows in schematic part block diagrammatical view a vehicle four wheel drive transmission system, as well as an internal combustion engine denoted by the reference numeral 1 of an automotive vehicle not otherwise shown. This engine 1 is mounted longitudinally in an engine room formed in the body of said automotive vehicle, the front of said vehicle being to the right as seen in the figure and the rear of said vehicle being to the left, and the aforesaid four wheel drive transmission system comprises an automatic transmission device 2 provided as directly coupled to and behind said engine 1 and a central differential device 3, i.e. a transfer device for four wheel drive operation, similarly provided as directly coupled to and behind said automatic transmission device 2. As will be seen later, the central differential device 3 is equipped with a control clutch denoted as 21 which according to engagement or disengagement thereof selectively either allows differential action between the vehicle rear wheels and the vehicle front wheels; and further there is provided a control system for this four wheel drive transmission system, which can incorporate either one of the first and the second preferred embodiments of the transmission control device of the present invention, for practicing either one of the first and the second preferred embodiments of the transmission control method of the present invention.

In more detail, the automatic transmission device 2 comprises a casing 6 which is formed with a distended torque converter housing portion 4, and within said torque converter housing portion 4 there is provided a torque converter 5 of a per se known type, the rotational power input member 8 of which is rotationally connected to the crank shaft (not particularly shown) of the engine 1. To the rotational power output member of said torque converter 5 there is rotationally connected the rotational power input member of an also per se conventional gear transmission mechanism 7, likewise housed within the automatic transmission casing 6. Thereby, the rotational power produced by the internal combustion engine 1 is transmitted, with a certain degree of slippage and torque amplification being applied thereto as is per se conventional, to the gear transmission mechanism 7. This gear transmission mechanism 7 is of a per se conventional type, being settable to provide various different values of speed reduction and torque amplification between its rotational power input member and its rotational power output member, according to control of said gear transmission mechanism 7 provided by a hydraulic control device 9, shown only as a block because various different conventional forms of such a device may be applied here. Typically, this gear transmission mechanism 7 may incorporate various selectively engagable friction engaging mechanisms such as clutches and brakes, and planetary gear mechanisms or the like for providing various different degrees of rotational power reduction and amplification gearing; the details of these matters will not be particularly discussed herein.

The central differential device 3 incorporates a planetary gear wheel type differential device 10 for providing so called full time four wheel drive operation, and this differential device 10 incorporates a sun gear 13 mounted on a sun gear shaft, a ring gear 14 positioned around said sun gear 13, a plurality of planetary pinions 12 fitted between said sun gear 13 and said ring gear 14 and meshed with both of them and performing planetary motion between them in a per se known manner, and a carrier 11, to which said planetary pinions 12 are rotationally mounted, and which is rotationally coupled, by a shaft fitted through a longitudinal hole formed through the sun gear shaft, to the aforementioned rotational power output member of the gear transmission mechanism 7, so as to be rotationally driven thereby. The ring gear 14 is rotationally connected to a shaft 15 for driving the rear wheels of the vehicle, and the other end of this rear wheel drive shaft 15 is connected, via a universal joint device 23, to the front end of a propeller shaft 24 which leads to a differential device (not particularly shown) for distributing rotational power between the rear wheels of the vehicle. Similarly, the sun gear 13 is rotationally connected, via a sleeve shaped front wheel intermediate drive shaft 16 which envelops this differential device and is coaxial with the aforementioned rear wheel drive shaft 15, to a sprocket 18. This sprocket 18 is connected, via an endless chain 20, to another sprocket 19 which is rotationally connected to a front wheel drive shaft 17. This front wheel drive shaft 17 is connected, via another universal joint device 25, to a front propeller shaft 26. This front propeller shaft 26 extends forwards along and underneath the gear transmission mechanism 2 generally longitudinally to the vehicle body, and at its front end is connected via yet another universal joint device 27 to a drive pinion shaft 31 of a differential device 30 for distributing rotational power between the front wheels of the vehicle. This drive pinion shaft 31 is rotatably supported by a differential case 32 which is formed integrally with the cast iron oil pan 29 of the internal combustion engine 1. And on the inner other end of said drive pinion shaft 31 there is mounted a drive pinion bevel gear 33 which is meshed with the ring gear 34 of the front wheel differential device 30.

In the central differential device 3 there is provided a locking clutch device 21, which is fitted between the sun gear 13 and the ring gear 14 and according to selective supply of hydraulic pressure to its pressure chamber (not particularly shown) selectively rotationally couples said sun gear 13 and said ring gear 14 together. And a hydraulic pressure supply and control device 22 is provided at a lower position in the central differential device 3 for selectively providing such actuating hydraulic pressure to said control clutch 21, according to a signal which said pressure supply and control device 22 receives. Thus, when the control clutch 21 is not engaged, then in a per se known way the central differential device 3 functions to provide differential action for distributing the rotational power outputted by the internal combustion engine 1 between the rear propeller shaft 24 and the front propeller shaft 26; but, when said control clutch 21 is engaged, then it forcibly locks the rotation of said rear propeller shaft 24 and the front propeller shaft 26 to be in a determinate ratio, and prevents any differential action between them.

The operations of the hydraulic pressure supply and control device 22 for the central differential device 3 and of the hydraulic control device 9 for the gear transmission mechanism 7 are controlled by a control device 35 for the transmission system as a whole, which dispatches control signals (which typically may be electrical signals) to said hydraulic control devices 22 and 9. The full functioning of this control device 35 for controlling the hydraulic control device 9 and thereby controlling the gear transmission mechanism 7 will not be described herein, since it is not directly germane to the present invention, and since the details thereof could vary over any of a wide variety of possibilities; however, it is required for the applicability of the present invention that the combination of the control device 35 and the hydraulic control device 9 should control the gear transmission mechanism 7 to operate in any one of a plurality of set transmission operational ranges, including a so called "D" range in which a relatively larger number of the speed stages of said gear transmission mechanism 7 are available to be engaged, and at least one so called intermediate hold range such as an "S" range and/or an "L" range in which a relatively smaller number of the speed stages of said gear transmission mechanism 7, excluding at least one higher one of said relatively larger number of speed stages, are available to be engaged. The one of these transmission operational ranges in which the transmission is currently being operated is manually set by the driver of the vehicle upon a manual set range control means, not particularly shown; and a manual set range position sensor 38 provided to said manual set range control means detects said set transmission operational range, and dispatches a signal representative thereof to the control device 35. Further, said control device 35 receives a signal representative of the current value of the road speed of the vehicle from a vehicle road speed sensor 36, and also receives a signal representative of the current value of the throttle opening of the internal combustion engine 1 from an engine throttle opening sensor 37. Typically, although this is not mandatory for the present invention, the control device 35 controls the engaged speed stage of the gear transmission mechanism 7 according to the values of said three signals which it receives, i.e. according to the current values of vehicle road speed, engine throttle opening, and set operational range, by following certain internally stored data such as shift range diagrams and so on. And, also typically although this is not mandatory for the present invention either, this control device 35 incorporates a microcomputer which obeys a control program, and incorporates various A/D and D/A converters which supply data to and output data from said microcomputer; this preferred construction for the control device 35 will be assumed in the following.

THE PREFERRED EMBODIMENTS

Particularly according to the concept of the present invention, in both of the preferred embodiments which will now be described, the control device 35 sends a signal to the hydraulic pressure supply and control device 22 for the central differential device 3 appropriate to engage the clutch 21 thereof, when (at least) the output signal from the manual set range position sensor 38 indicates that the range manually selected by the vehicle driver is a so called intermediate hold range such as an "S" range and/or an "L" range as described above, and thus of course said control device is also controlling the engaged speed stage of the gear transmission mechanism 7, via the hydraulic control device 9 therefor, as befits operation in said intermediate hold range. Optionally, further, other conditions may be imposed for the control device 35 to send such a signal for engaging the clutch 21 of the central differential device 3.

THE FIRST PREFERRED EMBODIMENTS

Figure 2:
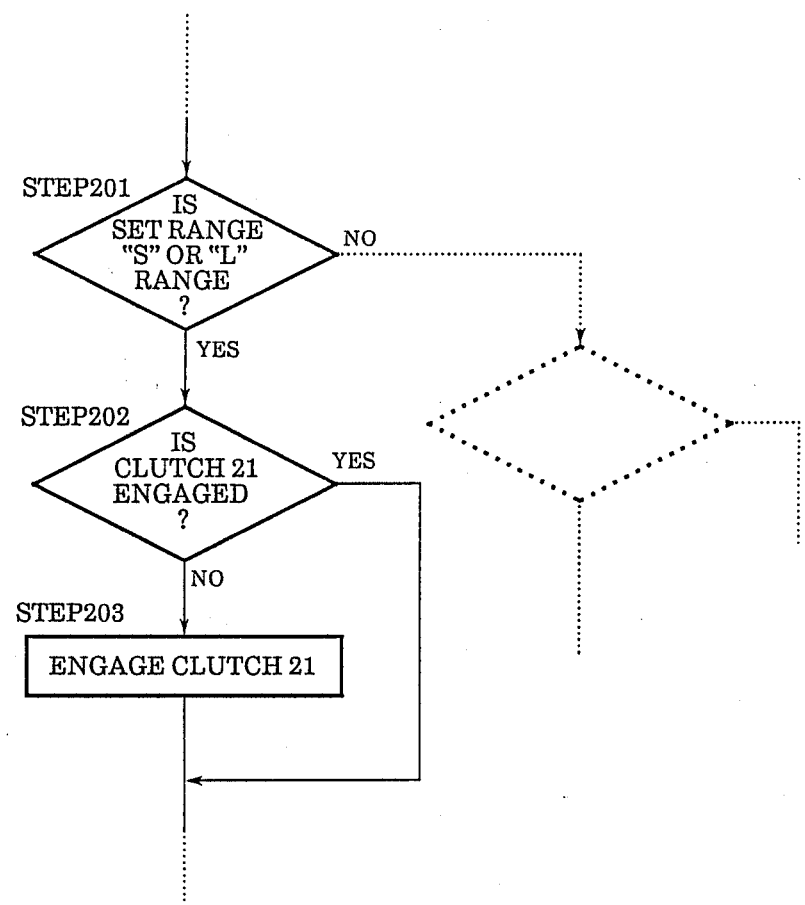
FIG. 2 is a flow chart of a fragment of a program executed by a microprocessor incorporated in the first preferred embodiment of the transmission control device of the present invention, as comprised in the vehicle four wheel drive transmission system shown in FIG. 1, for practicing the first preferred embodiment of the transmission control method of the present invention.

In FIG. 2 of the drawings there is shown a flow chart of a fragment of a program executed by the aforesaid microprocessor incorporated in the control device 35 utilized in the first preferred embodiment of the transmission control device of the present invention, as comprised in the vehicle four wheel drive transmission system shown in FIG. 1, said program operation implementing the first preferred embodiment of the transmission control method of the present invention. This program fragment is performed frequently during vehicle operation, as for example every time the crank shaft of the internal combustion engine 1 rotates through a determinate rotational angle.

First, in the decision step 201, a decision is made as to whether or not the output signal from the manual set range position sensor 38 to the control device 35 indicates that the image currently manually selectd by the vehicle driver is the "S" range or the "L" range, or not. If the answer to this decision is NO, so that the vehicle transmission is not currently being operated in the "S" range or in the "L" range, then it is deemed that central front/rear differential action as in fact is being performed by the central differential device 3 is currently acceptable, and then the flow of control passes next to leave this program fragment, without doing anything further. On the other hand, if the answer to this decision is YES, so that the vehicle transmission is in fact currently being operated in the "S" range or the "L" range, then it is in this first preferred embodiment deemed that central front/rear differential action by the central differential device 3 should be inhibited, and in this case the flow of control passes next to the next decision step 202.

In this decision step 202, a decision is made as to whether or not the control clutch 21 of the central differential device 3 is currently substantially engaged, or not. If the answer to this decision is YES, so that the clutch 21 is in fact currently engaged, then it is deemed that no further action is required, since the central differential device 3 is already not currently able to provide substantial differential action, and therefore the flow of control passes next to leave this program fragment, without doing anything further. On the other hand, if the answer to this decision is NO, so that the central differential control clutch 21 is in fact not currently engaged, then it is deemed that it is now proper to engage said clutch 21 in order to prevent the central differential device 3 from providing substantial differential action, and in this case the flow of control passes next to the step 203. In this step 203, the control device 35 sends a signal to the hydraulic pressure supply and control device 22 for the central differential device 3 appropriate to engage the clutch 21 thereof, so that said central differential device 3 is now prevented from providing any substantial differential action; and next the flow of control passes to leave this program fragment, without doing anything further.

Thus, in these first preferred embodiments of the method and the device of the present invention, the effect of this program fragment as a whole is to engage the clutch 21 of the central differential device 3, when the manually set operational range of the transmission is the "S" range or the "L" range. Accordingly, differential action between the rear wheels and the front wheels of the vehicle is provided by this central differential device, when the vehicle is being operated in a so called intermediate hold range such as the "S" range or the "L" range; and hence at this time good engine power characteristics and also good engine braking characteristics are made available, just in the operational circumstances in which they are needful, as outlined earlier in this specification.

THE SECOND PREFERRED EMBODIMENTS

Figure 3:
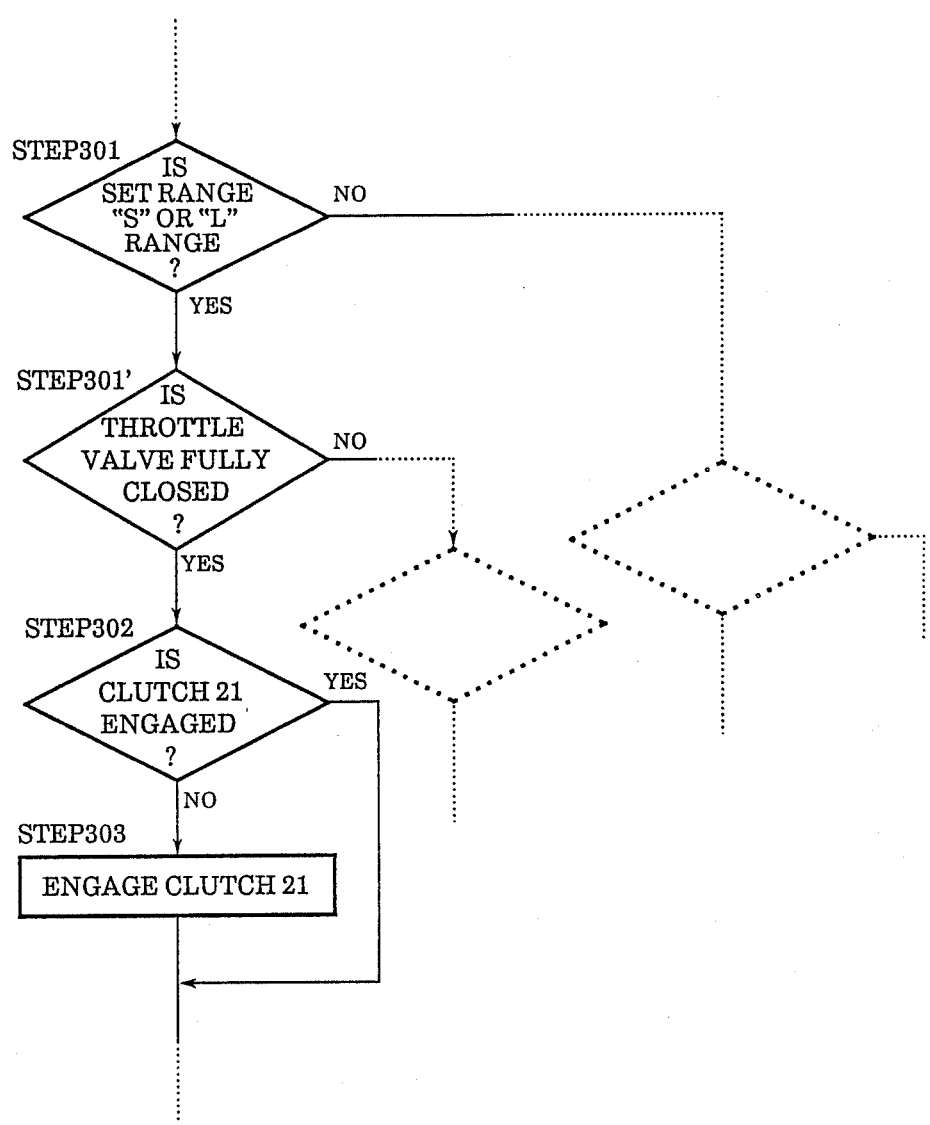
FIG. 3 is a flow chart of a similar fragment of a program executed by a microprocessor incorporated in the second preferred embodiment of the transmission control device of the present invention, also as comprised in the vehicle four wheel drive transmission system shown in FIG. 1, for practicing the second preferred embodiment of the transmission control method of the present invention.

In a similar manner to FIG. 2 relating to the first preferred method and device embodiments, in FIG. 3 of the drawings there is shown a flow chart of a fragment of a program executed by the aforesaid microprocessor incorporated in the control device 35 utilized in the second preferred embodiment of the transmission control device of the present invention, as comprised in the vehicle four wheel drive transmission system shown in FIG. 1, said program operation implementing the second preferred embodiment of the transmission control method of the present invention. This program fragment, as before, is performed frequently during vehicle operation, as for example every time the crank shaft of the internal combustion engine 1 rotates through a determined rotational angle. These second preferred embodiments place emphasis only upon the quality of engine braking operation, and not particularly upon high vehicle acceleration characteristics or hill climbing characteristics.

First, in the decision step 301, a decision is made as to whether or not the output signal to the control device 35 from the manual set range position sensor 38 indicates that the range currently manually selected by the vehicle driver is the "S" range or the "L" range, or not. If the answer to this decision is NO, so that the vehicle transmission is not currently being operated in the "S" range or in the "L" range, then (as before in the first preferred embodiments) it is deemed that central front/rear differential action as in fact is currently being performed by the central differential device 3 is currently acceptable, and then the flow of control passes next to leave this program fragment, without doing anything further. On the other hand, if the answer to this decision is YES, so that the vehicle transmission is in fact currently being operated in the "S" range or in the "L" range, then it is in this second preferred embodiment deemed that the next test for inhibition of central front/rear differential action by the central differential device 3 should be conducted, and in this case the flow of control passes next to the next decision step 301'.

In this next decision step 301', a decision is made as to whether or not the throttle valve of the internal combustion engine is currently substantially fully closed, or not. This decision is made by the control device 35 based upon the valve of the output signal of the throttle opening sensor 37, shown in FIG. 1. If the answer to this decision is NO, so that the throttle valve is not now in fact fully closed, then it is deemed that no further action is required, since the vehicle is not currently being operated in the full engine braking mode, and therefore the flow of control passes next to leave this program fragment, without doing anything further. On the other hand, if the answer to this decision is YES, so that currently full engine braking is being performed, then it is deemed that inhibition of differential action by the central differential device 3 is currently required, and in this case the flow of control passes next to the next decision step 302.

In this next decision step 302, a decision is made as to whether or not the control clutch 21 of the central differential device 3 is currently substantially engaged, or not. If the answer to this decision is YES, so that the clutch 21 is in fact currently engaged, then it is deemed that no further action is required, since the central differential device 3 is already not currently able to provide substantial differential action, and therefore the flow of control passes next to leave this program fragment, without doing anything further. On the other hand, if the answer to this decision is NO, so that the clutch 21 is in fact not currently engaged, then it is deemed that it is now proper to engage said clutch 21 in order to prevent the central differential device 3 from providing substantial differential action, and in this case the flow of control passes next to the step 303. In this step 303, the control device 35 sends a signal to the hydraulic pressure supply and control device 22 for the central differential device 3 appropriate to engage the clutch 21 thereof, so that said cental differential device 3 is now prevented from providing any substantial differential action; and next the flow of control passes to leave this program fragment, without doing anything further.

Thus, in these second preferred embodiments of the present invention, the effect of this program fragment as a whole is to engage the clutch 21 of the central differential device 3, when the manually set operational range of the transmission is the "S" range or the "L" range and additionally the engine throttle is substantially fully closed. Accordingly, differential action between the rear wheels and the front wheels of the vehicle is provided by this central differential device, when the vehicle is being operated in the engine braking mode in a so called intermediate hold range such as the "S" range or the "L" range; and hence at this time good engine braking characteristics are particularly made available, just in the operational circumstances in which they are needful, as outlined earlier in this specification.

Although the present invention has been shown and described in terms of the preferred embodiments of the method and of the device thereof, and with reference to the appended drawings, it should not be considered as being particularly limited thereby, since the details of any particular embodiment, or of the drawings, could be varied without, in many cases, departing from the ambit of the present invention. For example, although in the shown preferred embodiments of the method and the device of the present invention the operation of the central differential control clutch 21 was shown and described as completely locking up the central differential device 3, in other possible embodiments it would be possible for the differential action of said central differential device 3 to be only somewhat impeded, and not substantially completely prohibited as was the case in the two preferred embodiments shown and described. Accordingly, the scope of the present invention is to be considered as being delimited, not by any particular perhaps entirely fortuitous details of the disclosed preferred embodiments, or of the drawings, but solely by the scope of the accompanying claims, which follow.

What is claimed is:

1. A device for control of a four wheel drive transmission system for an automotive vehicle, wherein said transmission system includes:
   a gear transmission mechanism driven by an engine of said vehicle; and
   a central differential device driven from said gear transmission mechanism to provide rotational power to front wheels of said automotive vehicle and to rear wheels of said automotive vehicle while providing differential action between the combination of said front wheels and the combination of said rear wheels, said central differential device comprising a clutch which when engaged at least partly inhibits said differential action;
   said device for controlling said four wheel drive transmission system comprising:
   means for automatically controlling said gear transmission mechanism during vehicle operation to operate in any of several forward ranges of speed stages including a drive range and at least one lower range in which the engagement of at least one upper speed stage included in said drive range is prohibited; and
   means for controlling said clutch of said central differential device during vehicle operation to become engaged when said gear transmission mechanism is being controlled to operate in said at least one lower range by said automatic control means therefor.

2. For a four wheel drive transmission system for an automotive vehicle, said transmission comprising:
   a gear transmission mechanism drive by an engine of said vehicle; and a central differential device driven from said gear transmission mechanism to provide rotational power to front wheels of said automotive vehicle and to rear wheels of said automotive vehicle while providing differential action between the combination of said front wheels and the combination of said rear wheels, said central differential device comprising a clutch which when engaged at least partly inhibits said differential action;
   a device for control of said four wheel drive transmission system, comprising:
   means for automatically controlling said gear transmission mechanism during vehicle operation to operate in any of several forward ranges of speed stages including a drive range and at least one lower range in which the engagement of at least one upper speed stage included in said drive range is prohibited; and
   means for controlling said clutch of said central differential device to be engaged during vehicle operation when said gear transmission mechanism is being controlled to operate in said one lower range by said automatic control means therefor and also when a throttle value of said engine is substantially closed.

* * * * *